United States Patent
Chopard et al.

(10) Patent No.: US 7,473,404 B2
(45) Date of Patent: Jan. 6, 2009

(54) ADVANCED DEVICE FOR EXCHANGE AND/OR REACTION BETWEEN FLUIDS

(75) Inventors: Fabrice Chopard, Saint Martin d'Heres (FR); Marc Berthou, Saint Mammes (FR); Christian Aussudre, Avon (FR)

(73) Assignees: Alfa Laval Vicarb (FR); Electricite de France - Service National (FR)

( * ) Notice: Subject to any disclaimer, the term of this patent is extended or adjusted under 35 U.S.C. 154(b) by 839 days.

(21) Appl. No.: 10/680,388

(22) Filed: Oct. 7, 2003

(65) Prior Publication Data

US 2004/0109798 A1 Jun. 10, 2004

Related U.S. Application Data

(63) Continuation of application No. PCT/FR02/01416, filed on Apr. 24, 2002.

(30) Foreign Application Priority Data

Apr. 25, 2001 (FR) .................. 01 05578

(51) Int. Cl.
*B01J 19/24* (2006.01)
*F28F 3/08* (2006.01)

(52) U.S. Cl. .............. 422/190; 422/198; 422/200; 422/232; 422/236; 165/167

(58) Field of Classification Search .......... 422/190, 422/198, 200, 232, 236; 165/167
See application file for complete search history.

(56) References Cited

U.S. PATENT DOCUMENTS

| | | | |
|---|---|---|---|
| 4,065,936 A * | 1/1978 | Fenton et al. .......... | 62/3.3 |
| 5,498,278 A | 3/1996 | Edlund | |
| 5,525,311 A * | 6/1996 | Girod et al. .......... | 422/200 |
| 5,544,703 A * | 8/1996 | Joel et al. ............ | 165/167 |
| 5,727,118 A * | 3/1998 | Roussel et al. ........ | 392/494 |
| 5,829,517 A | 11/1998 | Schmid et al. | |
| 6,180,846 B1 * | 1/2001 | Dandekar et al. ...... | 585/443 |
| 6,190,624 B1 * | 2/2001 | Romatier ............. | 422/200 |
| 6,421,501 B2 * | 7/2002 | Berthou et al. ........ | 392/314 |
| 6,602,478 B2 * | 8/2003 | Brundage ............ | 422/194 |
| 6,709,640 B1 * | 3/2004 | Romatier et al. ...... | 422/200 |
| 6,919,048 B2 * | 7/2005 | Hoffmann et al. ..... | 422/146 |
| 6,935,772 B2 * | 8/2005 | Karp et al. ........... | 366/341 |
| 7,318,912 B2 * | 1/2008 | Pezzuto et al. ........ | 422/103 |

FOREIGN PATENT DOCUMENTS

| | | |
|---|---|---|
| DE | 197 53 720 A1 | 6/1999 |
| EP | 0529329 A2 | 3/1993 |
| EP | 1090878 A | 4/2001 |

OTHER PUBLICATIONS

International Search Report.

* cited by examiner

*Primary Examiner*—N. Bhat
(74) *Attorney, Agent, or Firm*—Alston & Bird LLP (57) ABSTRACT

A device for exchange and/or reaction between at least two fluids is taught and described herein comprising at least a first space of selected thickness and including side walls defining a first chamber provided with a central part at least partly recessed for a first fluid flow and at least a second chamber for a second fluid flow, the first and second chambers being separated by a first exchanging wall adapted to ensure exchange and/or reaction between fluids of thermal and/or mass transfer type.

25 Claims, 7 Drawing Sheets

ADVANCED DEVICE FOR EXCHANGE AND/OR REACTION BETWEEN FLUIDS

CROSS-REFERENCE TO RELATED APPLICATIONS

This application is a continuation of PCT Application No. PCT/FR02/01416, filed Apr. 24, 2002, which claims priority from French Patent No. 0105578, filed Apr. 25, 2001, which is hereby incorporated herein in its entirety by reference.

FIELD AND BACKGROUND OF THE INVENTION

The invention relates to the field of exchange and/or reaction between fluids, whether it concerns the exchange of calories or frigories, for example, by heating or cooling, or exchange of constitutive elements, for example by filtering or separation or absorption or desorption, or injection of a product(s), or a chemical reaction.

Numerous devices and numerous plants have been proposed to ensure the aforementioned exchanges (or processing). Most of them, whether they function continuously or intermittently, are designed so as to ensure a single function in a satisfactory manner, without the possibility of carrying out other functions. In a reactor functioning in an intermittent mode (for example, of the "batch" type), it is usually difficult to heat or cool reactants at the elected control level, even if this type of reactor is fitted with a double shell system or a coiled piping elements. Among the exchangers functioning continuously, are found, heat exchangers of the said "plate" and "tubes and calenders" types.

In the plate heat exchangers, only non-loaded fluids or very slightly loaded fluids may be dealt with, because of the reduced spacing between plates. On the other hand, they permit a relatively easy maintenance, because of their dismountability, but the volume defined between plates is reduced and dependent on the mode of plate manufacturing. In the tube and calender heat exchangers, it is possible to deal with loaded fluids by adapting tube diameters, but the maintenance connected, in particular, with pipe choking is difficult. Moreover, the presence of tubes makes these heat exchangers relatively bulky, which limits their applications.

In addition, neither of these types of heat exchangers are adapted to the other types of processings, such as filtering or separation. For these types of processings (or exchanges) which are not specifically thermal, there are numerous plants, but they are complex, bulky and poorly adaptable to processings different from those for which they were designed.

SUMMARY OF THE INVENTION

The object of this invention is to provide a different solution from those known.

To that effect it proposes an exchange system between at least two fluids, where it is provided, on the one hand, at least a "thick" first chamber, defined by the side walls of a first spacer, recessed so as to enable the flow of a first fluid and, on the other hand, at least a second "thin" or thick chamber for the flow of a second fluid, the first and second chambers being separated by a first exchanging wall enabling the exchange and/or a thermal reaction and/or by mass transfer, between fluids flowing in the first and second adjacent chambers.

The volume and the arrangement of the chamber determined by the spacer are variable. Consequently, the spacer may be completely or partly recessed, or define at least two independent subchambers. In the latter case, the subchambers may be defined by machining or forming.

In this way, a heat exchanger and/or a reactor capable of processing a fluid in a reduced volume is created, providing also the advantages presented by the plate heat exchangers. In addition, according to the type of exchange wall used between the first and the second chambers (plate or diaphragm), the processing may be either thermal or "physical" (filtering or separation of constitutive elements), or simultaneously thermal and physical. The processing may also be chemical if a reactive material is placed in the first chamber, or a mixture of materials, or if a reactant is introduced, such as a catalyst. The elements comprising these materials may be fixed on a side wall, or hung between two attached (or stacked) plates, or be inserted within the volume of the spacer chamber. Injection nozzles may be considered to enable injection of one or several reactants in a chosen area of the chamber.

The invention may be used for endothermic or exothermic reactions.

Numerous embodiments may be considered for the device according to the invention, and namely:

the first spacer may comprise a first closed side wall, forming the first exchange wall and presenting an outer side arranged to cooperate with a plate, or a first or a second closed wall of a spacer of another block, so as to define the second chamber. In this case, the first spacer and the inserted plate (or the first spacer only) define a modular processing block, and several blocks may be serially mounted and/or in parallel, once their first spacer includes a second side wall, parallel (or inclined to) to the first closed side wall, and opened so as to be closed by the plate of another block (or closed to define a second chamber with the first wall of the next block). The inserted plate may be slightly recessed in the spacer or arranged against the latter (by being possibly secured to it). Alternatively, another first spacer, of which the outer side of the first exchange wall is destined to be closed tight by the plate of the modular block to define another second chamber is considered, both first spacers and the plate thus defining a modular processing overblock;

the first spacer may include a first opened side wall, and at least a first and a second plate jointly defining the second chamber (either by welding or by brazing, or by stacking with interposition of a gasket) has been planned for, the first plate being additionally destined to close the first opened side wall by forming the first exchange wall. In this case, the first spacer and the first and second plates define a modular processing block, and several modular blocks may be serially mounted and/or in parallel once their first spacer comprises a second opened side wall, facing a first opened side wall, and destined to be closed tight by the second plate of another block;

one may also consider a second thick spacer comprising side walls defining a second recessed chamber so as to enable the circulation of the second fluid, the first and second spacers presenting respectively the first opened side walls destined to be placed one facing the other, with the interposition of a separation diaphragm or a plate forming the first exchange wall. In this case, the first and second spacers and the diaphragm define a modular processing block, and several modular blocks may be serially or mounted in parallel once their first spacer comprises a second side wall, either opened and destined to face a second opened side wall of another block with the interposition of another diaphragm or a tight plate, or closed and destined to face a second closed side wall of another block;

it is possible also to consider i) blocks made up of a first spacer, comprising two opened side fronts, and a second spacer including a closed side front and an opened side front, with possible interposition of an exchange diaphragm between both spacers, or ii) blocks made up of a first and second spacers, each comprising two opened side fronts, and two plates framing both spacers placed side by side, with possible interposition of an exchange diaphragm between both spacers, or iii) blocks made up of the first and second spacers, each comprising two opened side fronts, with possible interposition of an exchange diaphragm between both spacers, and two groups of two plates each framing the two spacers placed side by side spacers so as to define a fluid flow path between two blocks.

In each embodiment integrating a spacer fitted with a closed side wall, the latter may be formed by machining (or recessing) or by attachment to an inserted plate, of the same material as that of the spacer or of another material. The attachment may be permanent (by welding, brazing or gluing) or temporary (stacking with interposition of a gasket).

According to another feature of the invention, at least some of the plates forming an exchange wall are fitted with fluid disturbing devices, so as to encourage the thermal exchanges between the first and the second fluids. The disturbing devices may be formed on plate surfaces, for example, by pressing, or attached to the plate surfaces. Alternatively, the disturbing devices may be placed in the chambers.

According to yet another feature of the invention, at least one of the spacers may include means for fluid injection, such as a nozzle enabling the introduction of a third fluid into the chamber of this spacer. One can be also plan for several nozzles destined to introduce fluid(s) or product(s) into chosen different locations of a spacer.

According to yet another characteristic of the invention, at least one of the spacers may include an attached static mixing element, such as for example a vortex, or metallic foam, or a catalytic foam or lining, or also a vortex generator or a stirrer, such as for example the fins of the "Offset strip fins" type. But it is also possible that a spacer includes several elements similar to those mentioned above, including elements enabling different functions. This or these elements might be included in, or realised in the form of an insert of the cartridge type.

The fluid flow within a chamber may be either practically parallel to the closing plates (or side fronts), and in one pass, or not linear because it follows a flow path, for example step by step, destined to increase the time it is present within the chamber, for example. Such a path may be defined by additional cells placed in the chamber.

According to yet another characteristic of the invention, at least one of the spacers may be constituted by assembling (or juxtaposition) of at least two sub-spacers, possibly of different dimensions. The volume of the chamber thus determined is chosen in function of flow parameters in particular: load, viscosity, residence time and likewise.

The invention can be applied in many ways, and in particular in the field of thermal and/or chemical processing of a first liquid or fluid, especially foodstuffs or chemicals, or the field of separation or mixing of components of a first complex fluid, for example by filtering.

BRIEF DESCRIPTION OF THE DRAWINGS

Other characteristics and advantages of the invention will become apparent after checking the detailed description hereunder in conjunction with the drawings attached, on which

The drawings attached are, essentially, of a certain character. Consequently, not only may they be used for completing the invention, but also for contributing to its definition, as the case occurs.

DETAILED DESCRIPTION

In the description that follows, reference will be made to a fluid processing device loaded with particles. Of course, this is only one application among numerous other ones, which is in no way exhaustive.

Figure 1:
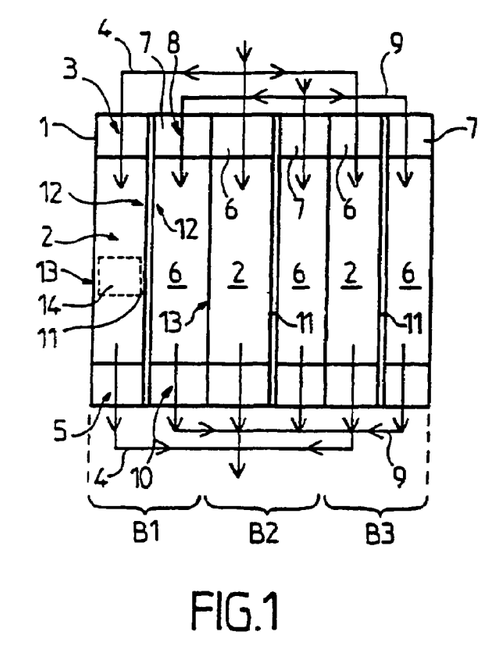
FIG. 1 is a diagrammatical cross section view of a first embodiment of a device according to the invention.

First, refer to FIG. 1 for the description of a first embodiment of a device according to the invention. In this first example, the device comprises a first thick spacer 1, the side walls of which demarcate a first chamber 2 recessed, so as to enable the flow of a first fluid. The dimensions of the spacer 1, and especially its thickness, are selected depending on the characteristics of the first fluid and the exchanges and/or process to be ensured. Here a spacer is understood to be a single block, or a set of several blocks or subblocks placed one next to the other. In other words, the word spacer is to be understood as an element or a set of elements defining a fluid flow chamber. As a matter of fact, this type of device may be used for processing fluids by controlling the residence time and/or the reaction time. But, it may also be used for processing fluids of high viscosity or containing fibres or particles.

In the illustrated example, the first fluid enters the first chamber 2 through an inlet 3 formed in a part (here it is the "upper" part) of the first spacer 1. This inlet 3 is supplied by a first supplying circuit 4 which is, for example, connected to a reservoir containing a first fluid to be processed.

The first spacer 1 comprises, on the other hand, in another side wall (here in its <<lower>> part) an outlet 5 connected to the supplying circuit 4 for driving out of the first chamber 2 the first fluid processed in it.

In the example illustrated in FIG. 1, the processing of the first fluid consists of heating or cooling, by means of a second fluid which flows in a second recessed chamber 6, defined by the side walls of a second spacer 7. The thickness of this second spacer 7 is chosen depending on the characteristics of the fluid it is to receive. So, preferably, if both fluids are identical, spacers 1 and 7 are chosen with practically identical dimensions. The second spacer 7 is, preferably, of dimensions practically identical to those of the first spacer 1, so as to allow for assembling them easily one to the other by of appropriate means of fixation, for example by gluing, welding or screwing by means of tie-rods and nuts, possibly by fitting a gasket between them.

The second spacer 7 comprises additionally an inlet 8 (here it is formed in a side wall of its upper part), supplied by a second supplying circuit 9 with a second hot or cold fluid, as well as an outlet 10 (here formed in a side wall of its lower part), connected to the said second supplying circuit 9 to drive out the second hot fluid once it has flowed within the second chamber 6.

In the example illustrated in FIG. 1, the exchange of calories or frigories between the second hot fluid and the first fluid is ensured via a thermal exchange wall constituted by a plate 11 made from a thermally conductive material.

This plate 11 is tightly placed between the first 1 and second 7 spacers. Preferably, this plate 11 is of metallic type and comprises the disturbing devices 15 (represented on FIGS. 8 to 10) destined to aid in the thermal exchange between the second fluid and the first fluid. These disturbing devices may be the result of a deformation obtained by pressing technology, for example, and due to this, they are part of the plate. But they may also be elements attached to a practically flat plate.

Moreover, and as illustrated, the first 1 and the second 7 spacers include each a first opened side wall 12, 13 so as to allow for the fluids to lap against the parallel sides of plate 11 which closes the first 2 and second 6 chambers. Each spacer 1, 7 includes, additionally, a second closed side wall 13, placed practically in parallel to the first opened side wall 1. Alternatively, the first 12 and second 13 side walls of each spacer could be opened, the second side walls 13 of both spacers so being closed by a plate of the type 11 of plate forming the thermal exchange wall.

The first 1 and second 7 spacers and the plate 11 placed between these spacers form a modular block B. As illustrated in FIG. 1, several modular blocks B may be associated in one and the same device, either in parallel (as illustrated), or serially, or serially and in parallel. More specifically, in the illustrated example, three modular blocks B1 to B3 are attached one to the other and supplied in parallel with fluid by the first 4 and second 9 supplying circuits. Of course, alternatively, the blocks could be arranged so as to function serially, the outlets 5 and 10 of the first block B1 supplying the inlets 3 and 8 of the second block B2, the outlets of the second block B2 supplying the inlets of the third block B3 and the outlets of the third block B3 supplying the first 4 and second 9 circuits.

Furthermore, a device of this type could be used to ensure a mass transfer between the first and second fluids, or a heat exchange and a mass transfer. To this end, the heat exchange plate 11 is substituted by a diaphragm chosen in function of the type of exchange desired. This may be, for example, a filtering diaphragm which authorizes only a one-way passage of a given constitutive element of the first fluid towards the second, in view of separating constitutive elements or a mixture of constitutive elements. Such a diaphragm may be either inserted between both spacers 1 and 7, or previously attached to one of either spacer.

On the other hand, it is also possible to provide an attached (or insert) element 14 (shown in dotted line) inside one of the first 2 and second 6 chambers. Such an insert may, for example, be constituted of a cartridge including a processing material such as a catalytic foam or a reactant. It may also be a vortex generator, or a stirrer. Otherwise, when several modular blocks Bi are serially and/or in parallel mounted, the successive chambers may include inserts of different types.

Figure 9:
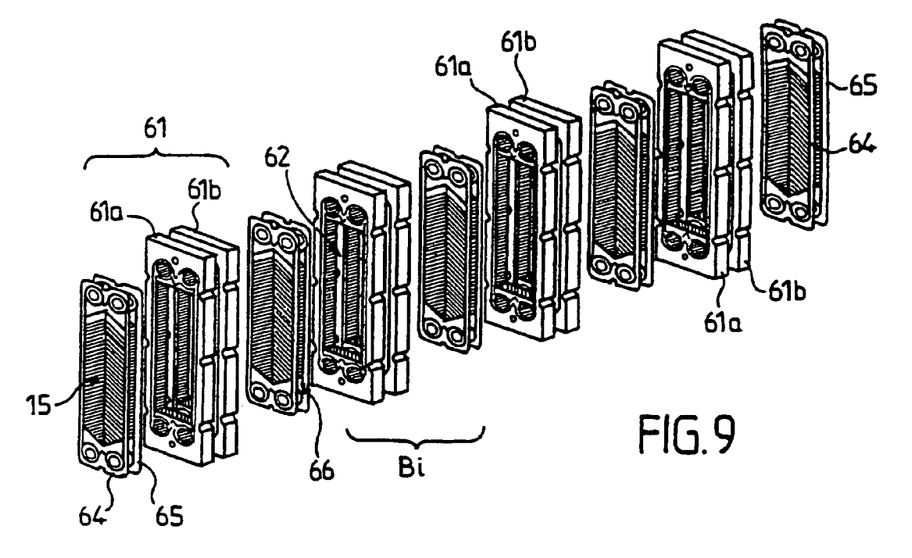
FIG. 9 is an alternative of the device illustrated in FIG. 8.
Figure 10:
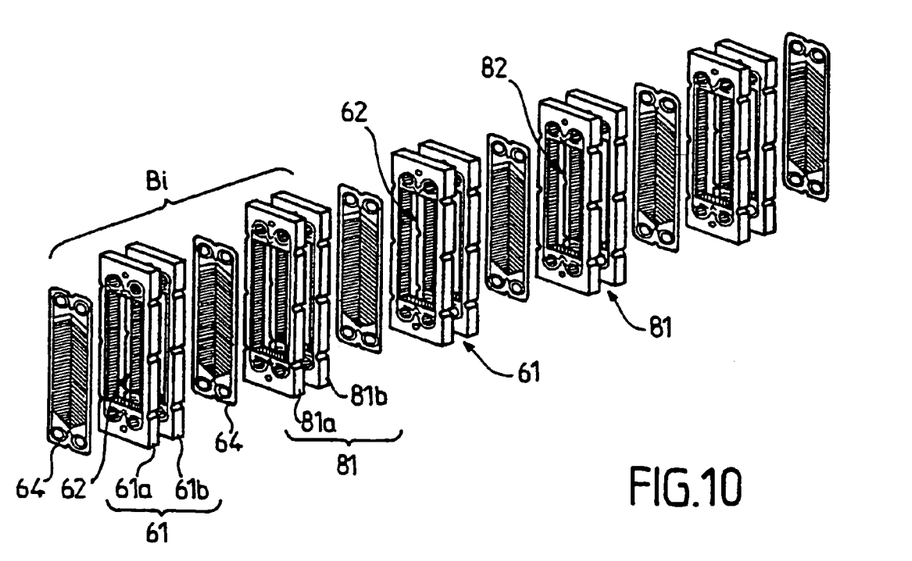
FIG. 10 is an exploded perspective view of an eighth embodiment of a device according to the invention, (alternative to the device illustrated in FIG. 9)
Figure 11A:
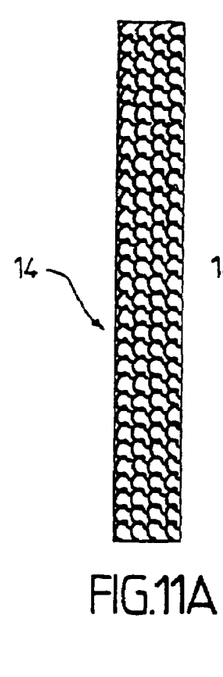
FIGS. 11A to 11D illustrate the different alternatives of inserts that can be placed in the first spacer chambers of devices according to the invention.
Figure 11B:
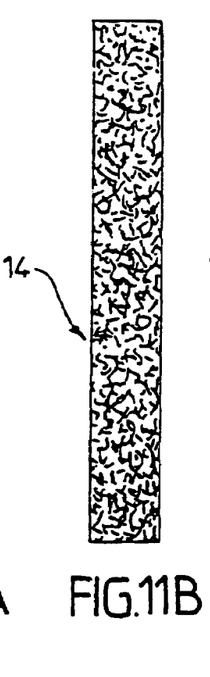
Figures 11C, 11D:
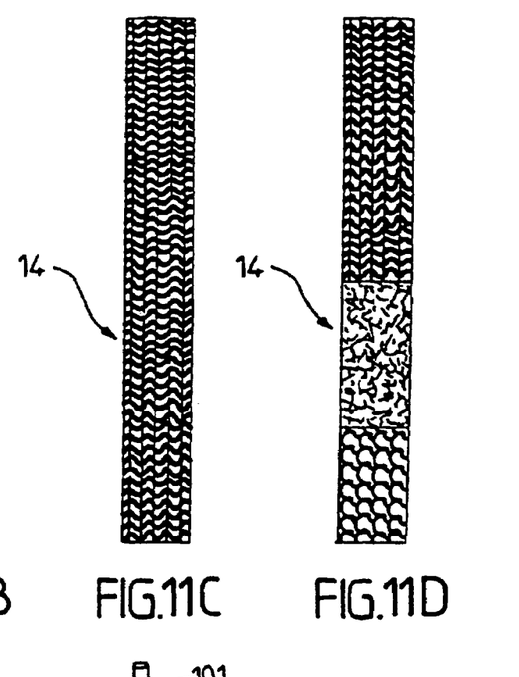

As illustrated in FIGS. 9 and 10, it is possible to use several (sub-) spacers placed side to side to define a same chamber. The thickness of the first or second chambers may also vary from one block to another. Of course, the (sub)spacers must have opened first and second side walls. Alternatively, the spacers which determine a chamber (first or second) may be different, one having both opened and closed side walls, the other having all side walls opened.

It is also possible to use identical first 1 and second 7 spacers.

At least one of the first and/or second spacers may also comprise means of injection (see FIGS. 12 to 15, and 20), such as, for example, a nozzle that can introduce at a chosen location of a chamber (preferably a first chamber 2) a product specifically destined, for example, to control a chemical reaction within the said chamber. Several nozzles may be provided in one spacer, so as to inject one or several different fluids at chosen locations (see FIG. 15). For example, a nozzle may be used for supplying reactant for a chemical reaction at a chosen location depending on the type of this reaction.

Such nozzles are particularly adapted to devices equipped with a cooling circuit for exothermic reactions or a heating circuit for endothermic reactions, such as, for example those illustrated in FIGS. 2 to 10. The device shown in FIG. 1 might also be used, subject to the intermediate plate 11 being of the electric type (in this case, both fluids flowing in the spacers 1 and 7 are identical).

Figure 2:
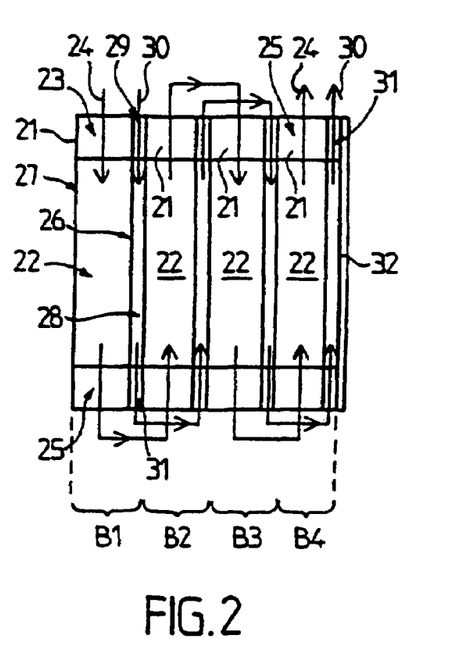
FIG. 2 is a diagrammatical cross section view of a second embodiment of a device according to the invention.

We now refer to FIG. 2 to describe a second embodiment of a device according to the invention. In this example, the device comprises a thick spacer 21 the side walls of which determine a first chamber 22, so recessed as to allow for the flow of a first fluid. As in the previous example, the spacer 21 includes an inlet 23 connected to a first supplying circuit 24 with a first fluid and an outlet 25 to drive the first processed fluid out of the first chamber 22.

This first chamber 22 is determined by the practically parallel first 26 and second 27 side walls. Of course, these side walls could be differently inclined, for example significantly opposed, relating to a vertical direction. The first side wall 26 is formed so as to define at its outer face a second chamber 28 destined to receive a second fluid. The spacer 21 comprises, therefore, a second inlet 29 connected to a second supplying circuit 30 with a second fluid and a second outlet 31 for driving the second fluid out of the second chamber 28.

In the simplest configuration, the device is a heat exchanger which only includes one spacer 21 and a plate destined to cooperate with the outer face of the first wall 26 of the spacer 21 to define the second chamber 28 (or in other words, to ensure sealed closure of the chamber 28). The example which is illustrated in FIG. 2 is more sophisticated in so far as it proposes a device comprising four serially mounted modular blocks B1 to B4, each modular block Bi (i=1 to 4) being constituted of a spacer 21, the second closed wall 27 of a spacer 21 closing the second chamber 28 of the previous block, and the second chamber 28 of the last block (here B4) being closed by a final plate 32. In a <<loop-like>> alternative, the final plate 32 may also act as an inlet plate to B1, thus allowing for a complete framing of the second circuit by the first and last channels.

As a consequence, in this example, the first 25 and second 31 outlets of the first block B1 respectively supply the first 23 and second 29 inlets of the second block B2 and so on, the first 25 and second 31 outlets of the last modular block (here B4) being respectively connected to the first 24 and second 30 fluid supplying circuits.

It is obvious that in the example illustrated in FIG. 2, the dimensions of the second chamber 28, and in particular it thickness, are determined by the configuration of the outer face of the second wall 26 of the spacer 21.

A parallel distribution of co-current or against-current type may be considered.

Figure 3:
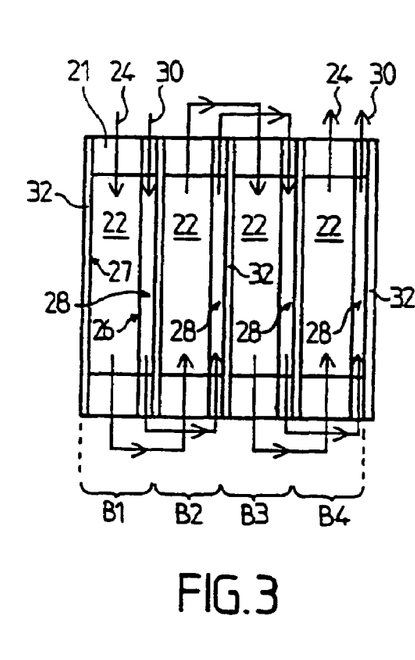
FIG. 3 is a diagrammatical cross section view of a third embodiment of a device according to the invention.

The device illustrated in FIG. 3 is an alternative to the device illustrated in FIG. 2. In this alternative, the first wall 26 of each thick spacer 21 is closed, while the second wall 27 of this spacer is opened and closed by a plate 32, for example a metallic one. In a loop-like alternative, the final plate 32 may also act as an inlet plate to B1, thus allowing for a full framing of the second circuit by the first and last channels.

A modular block Bi is therefore constituted here of a plate 32 and a spacer 21. The blocks Bi may be serially (as illustrated) mounted and/or in parallel, as in the example of FIG. 1. In the illustrated example in FIG. 4, the device comprises thick spacers 41, of a practically symmetric shape, due to the fact that they include first 42 and second 43 side walls which are preferably significantly identical and each determining, by their outer conformed face, a part at least of a second chamber 46. Each spacer 41 comprises, as in the illustrated examples in FIGS. 2 and 3, i) a first inlet 47 connected to a first supplying circuit 48 with a first fluid to supply a first chamber 45, ii) a second inlet 49 connected to a second supplying circuit 50 with a second fluid, iii) a first outlet 51 for driving the first fluid out of the first chamber 45, and iv) a second outlet 52 to drive the second fluid out of the second chamber 46. As a matter of fact, each spacer 41 may include other inlets and outlets for the second fluid, in so far as it defines by the outer faces of its first 42 and second 43 side walls, two second chambers 46 (at least partly) in which the second fluid may flow in parallel and preferably in the same direction.

Figure 4:
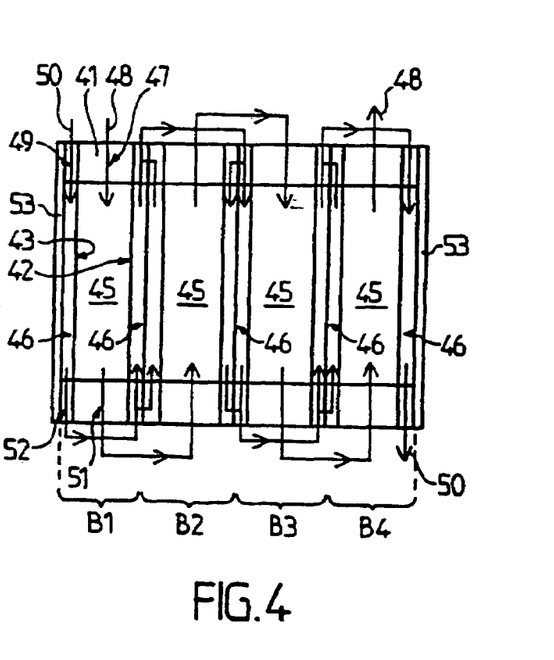
FIG. 4 is a diagrammatical cross section view of a fourth embodiment of the device according to the invention.

In this example, each spacer 41 constitutes itself a modular block Bi. Here, four modular blocks B1 to B4 are serially mounted, outlets of one supplying inlets of the other. But, alternatively, the blocks could be mounted in parallel.

The outer face of the first side wall 42 of a first block determines with its outer face of the second side wall 43 of the following block a second chamber 46. In other words, each outer face, which is not placed at one end of the device, determines a second "half-chamber". The second chambers 46 determined by the second 43 and first 44 side walls of the spacers 41, placed at both opposed ends of the device (in fact, B1 and B4), are each closed by a plate 53, so that both second chambers 46 they jointly determine at the ends of the device, are approximately twice smaller in volume than those of the other second "intermediate" chambers 46.

The device of FIG. 4 may also be seen as an assembly of modular processing "over-blocks" constituted each of two first spacers 41 and the plate 53.

In an alternative to the device in FIG. 4, it is possible to insert, between two spacers 41, a diaphragm, so as to subdivide into two parts the second chamber determined by the outer faces of the preformed side walls of the successive spacers. Thus, it is possible to consider in particular an exchange of molecules, atoms or ions between fluids (for example different gases) which flow in both parts of a second chamber.

Figure 5A:
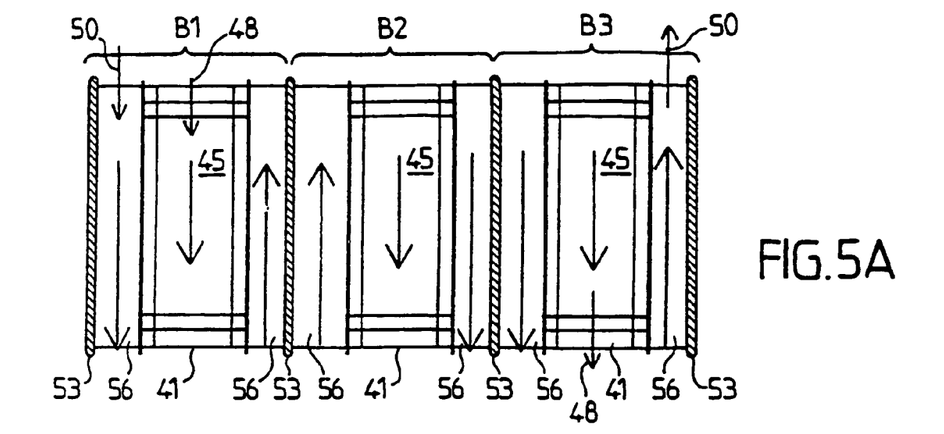
FIGS. 5A and 5B are diagrammatical section views of two alternatives of a fifth embodiment of a device according to the invention.

The device illustrated in FIG. 5A is an alternative to the device illustrated in FIG. 4. Here, a plate 53 is provided between two thick adjacent spacers 41 with preformed outer walls. Consequently, in this embodiment, a modular block Bi is constituted by a spacer 41 and a plate 53. Each spacer 41 so determines a first chamber 45 and two second chambers 56 which are each closed by a plate 53 which belongs to the next block (or previous one), or by a final plate of the device, as described above in reference to FIG. 4. In this example, a first fluid flows in the chambers 45, preferably in the same direction, for example from top to bottom, while a second fluid flows in an alternating manner in the second chambers 56, for example from top to bottom, then from bottom to top, then from top to bottom, and so on.

Figure 5B:
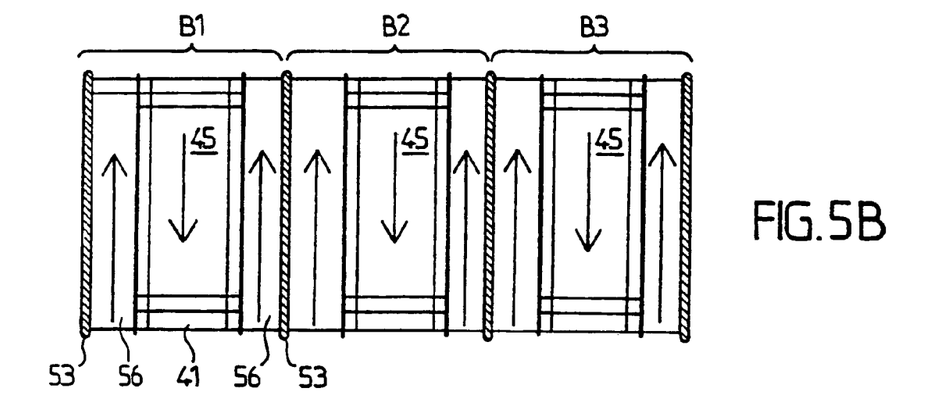

The device illustrated in FIG. 5B is an alternative to the device illustrated in FIG. 5A, relating to the question of the circulation of fluids. In this example, a first fluid flows in the chambers 45, preferably in the same direction, for example from top to bottom, while a second fluid flows in a second direction, preferably in the opposite direction to the first direction, in the chambers 56.

Figure 6A:
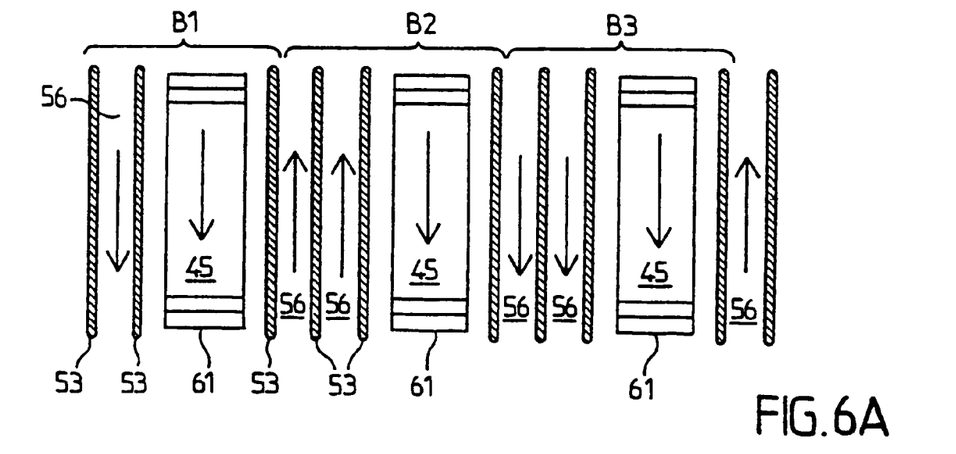
FIGS. 6A and 6B are diagrammatical section views of two alternatives of a sixth embodiment of a device according to the invention.

The device illustrated in FIG. 6A is another alternative to the device illustrated in FIG. 5A. Here, the second chambers 56 are determined by pairs of plates 53, that are placed on each side of the opened side walls of the thick spacers 61, determining each a first opened chamber 45. As a consequence, in this embodiment, a modular block Bi is constituted by a pair of plates 53, a spacer 61 and a plate 53. In this example, a first fluid flows in the chambers 45, preferably in the same direction, for example from up downwards, while a second fluid flows in an alternate manner in the second chambers 56, for example from top to bottom, then from bottom to top, then again from top to bottom, and so on.

Figure 6B:
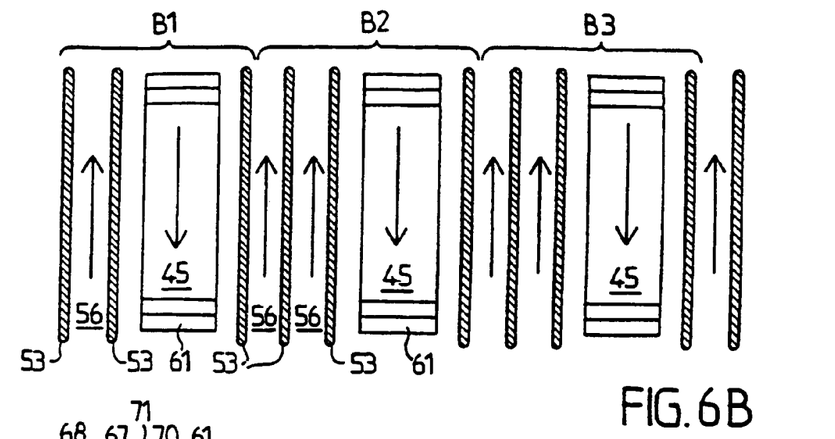

The device illustrated in FIG. 6B is an alternative to the device illustrated in FIG. 6A, relating to the question of the circulation of fluids. In this example, a first fluid flows in the chambers 45, preferably in the same direction, for example from top to bottom, while a second fluid flows in a second direction, preferably in an opposite direction to the first direction, in the chambers 56.

Figures 7, 8:
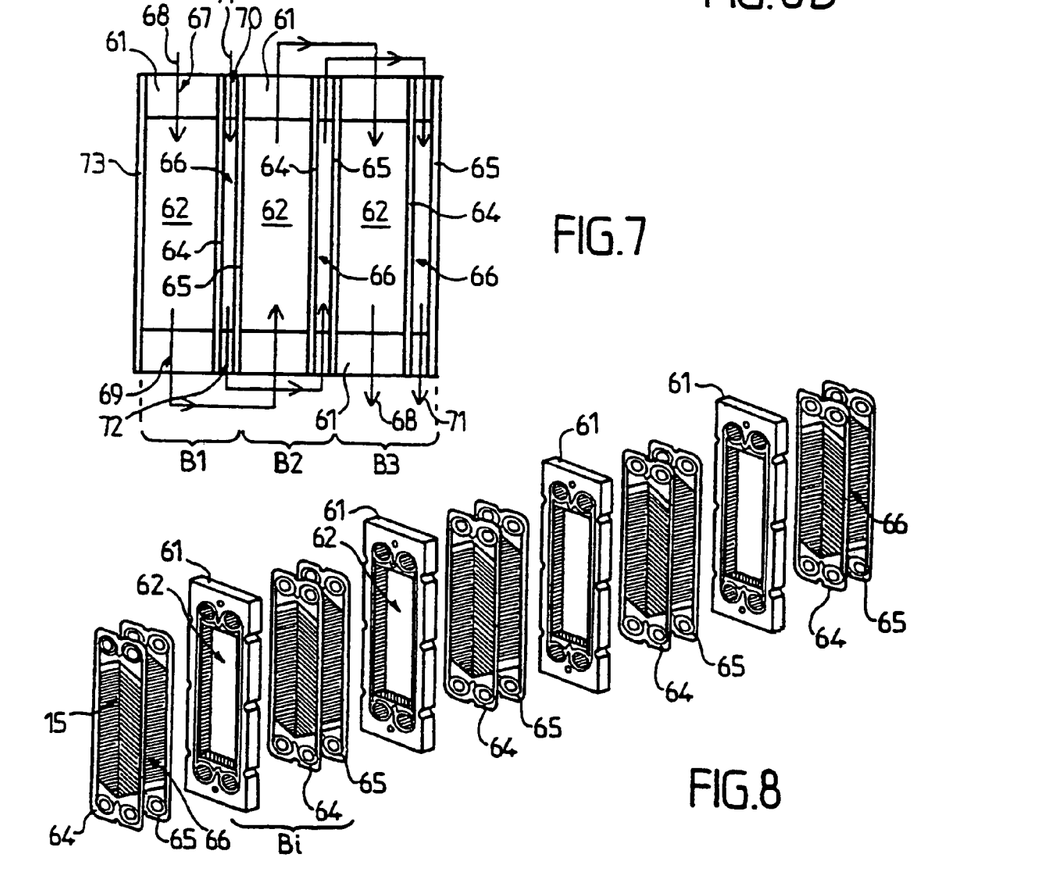
FIG. 7 is a diagrammatical cross section of a seventh embodiment of a device according to the invention.
FIG. 8 is an exploded perspective view of a device of the type of that illustrated in FIG. 7.

In the example illustrated in FIGS. 7 à 9, the device still comprises a spacer 61 the side walls of which determine a first recessed chamber 62, but this time, the second chamber 66, in which flows the second fluid, is defined by two plates 64 and 65, of the type of those used in traditional plate exchangers. These two plates 64 and 65 may be firmly attached before being mounted to the spacers 61.

In this example, a spacer 61 and two plates 64 and 65, which determine a second chamber 66, constitute a modular block Bi. Here, three modular blocks B1 to B3 were serially mounted, but, of course, they could be more numerous, and/or mounted in parallel or mounted serially and in parallel.

The spacer 61 of the first block B1 comprises an inlet 67 connected to the first supplying circuit 68 with a first fluid, so as to supply the first chamber 62, and an outlet 69 to drive the first processed fluid out of the first chamber 62. In the same way, the plates 64 and 65, which determine the second chamber 66, comprise an inlet 70 connected to a second supplying circuit 71 with a second fluid to supply the said second chamber 66, and an outlet 72 to drive the second fluid out of the second chamber 66.

Of course, in this example, the spacers 61 have first and second side walls opened and destined to be closed by one of the plates 64 or 65 of a previous block, or by a final plate 73. An end plate, acting as an inlet plate, may enable the full framing by the first and last channels of the second fluid supplying circuit.

Alternatively, as illustrated in FIGS. 8 and 9, a final plate 73 may be substituted by two other plates 64 and 65 which determine a second additional chamber 66.

In the examples illustrated in FIGS. 1 to 7, the inlets and outlets were marked by arrows to facilitate understanding of the flow directions of the different fluids. Of course, and as illustrated in FIGS. 8 to 10, the different inlets and outlets may be favourably integrated in the spacers and in the plates, as is well known by those of the art.

The device illustrated in FIG. 9 is an alternative to that illustrated in FIG. 8, in which each thick spacer 61 is constituted by two sub-spacers 61-*a* and 61-*b* so as to increase the thickness of each first chamber 62.

The device illustrated in FIG. 10 is an alternative to that illustrated in FIG. 9, in which are provided first thick spacers 61, constituted (in this case) by two sub-spacers 61-*a* and 61-*b* in order to increase the thickness of each first chamber 62, alternating with second thick spacers 81, constituted (in this case) by two sub-spacers 81-*a* and 81-*b* in order to increase the thickness of each second chamber 82, by inserting a plate between each successive first 61 and second 71 spacers.

All that has been indicated in the description relating to the first example of the device illustrated in FIG. 1, also applies to the other examples of embodiments illustrated in FIGS. 2 to 10. In particular, certain chambers formed in the spacers may contain one or more inserts, and certain spacers may be equipped with nozzles for injecting a specific product destined, for example, for controlling a chemical reaction in a chamber.

Four examples of insert realization are shown in FIGS. 11A to 11D.

Figure 12:
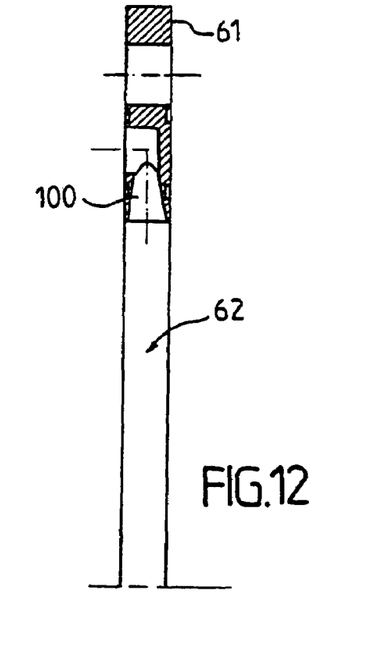
FIGS. 12 to 15 illustrate different alternatives of nozzles destined to be at least partly placed in spacer chambers of devices according to the invention.
Figure 13:
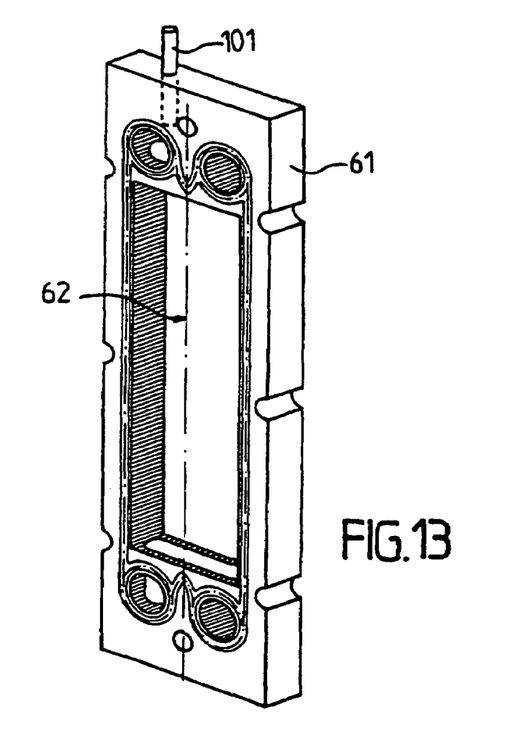
Figure 14:
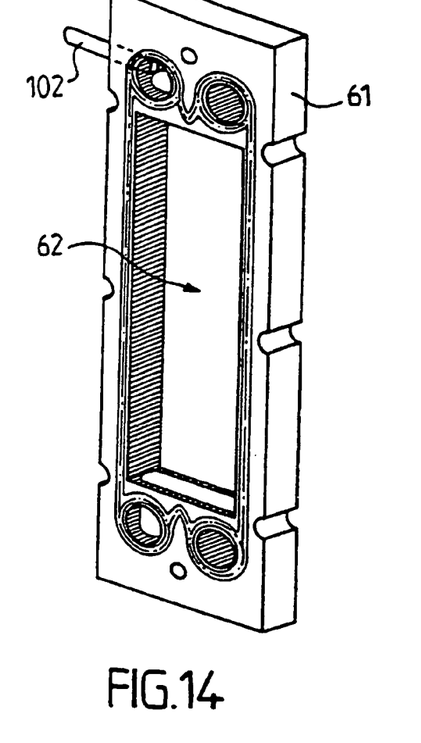
Figure 15:
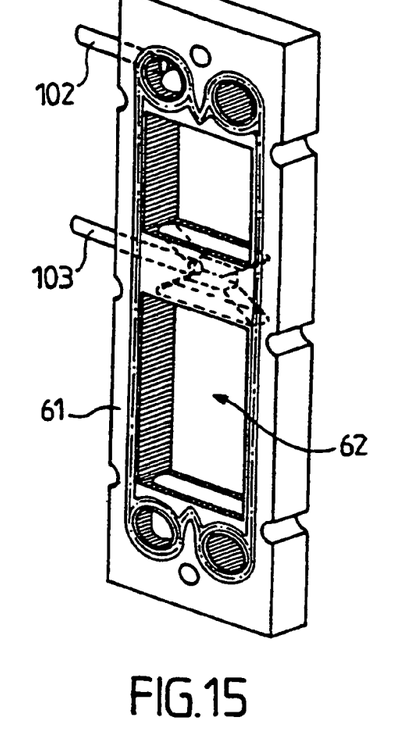

In FIGS. 12 to 15 are also shown examples of spacers equipped with nozzles. More specifically, in FIG. 12 is illustrated a conical-shaped nozzle 100, in FIG. 13 is shown a vertical cylindrical nozzle 101, in FIG. 14 is illustrated a horizontal cylindrical nozzle 102, and in FIG. 15 are illustrated a first upper horizontal nozzle 102 of the cylindrical type and a second intermediate horizontal nozzle 103.

Otherwise, as mentioned previously, in all the examples of the devices previously described, tightness between consecutive spacers or between a spacer and a plate may be ensured either through a sealing means (a flat peripheral gasket or an o'ring, metallic or not, located on one of the two elements), or by gluing or welding.

Furthermore, the different spacers may be made of a polymer type material, for example PEEK (English acronym for PolyEtherEtherKetone). But numerous other materials may also be considered, such as, for example glass, ceramics, or metal (stainless steel, titanium, aluminum, for example). The embodiment of these spacers depends on the material(s) used: machining and/or welding and/or forming and/or pressing.

Figure 16:
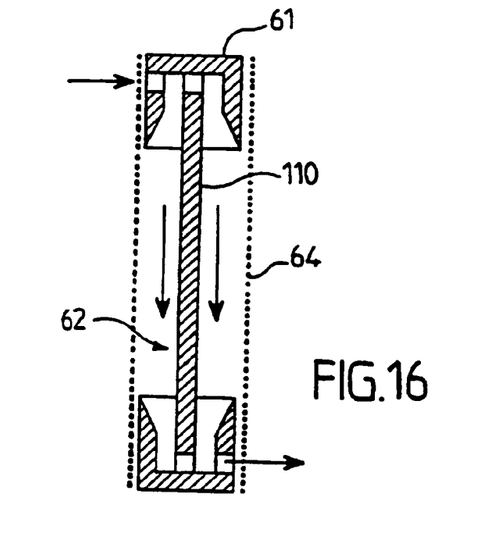
FIG. 16 is a diagrammatical cross section of a spacer comprising a wall, FIGS. 17A à 17C are cross diagrammatical views of spacers combined to plates or diaphragms.
Figure 17A:
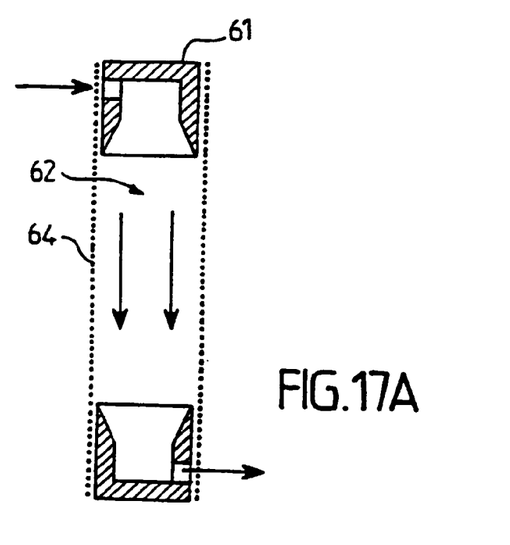
Figures 17B, 17C:
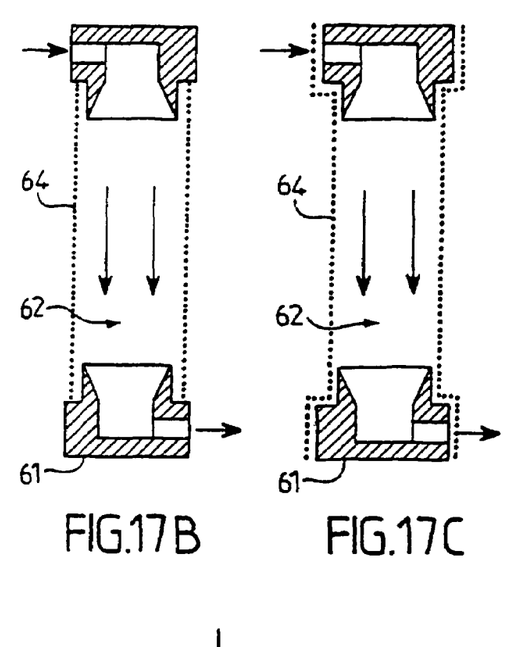

Moreover, the flow of fluid inside the device may be either completely alternate (upwards/downwards/upwards/downwards . . . ), which corresponds to a "serial" flow, as previously indicated, or partly alternating (upwards then downwards or downwards then upwards), which corresponds to a "parallel/serial" flow type. More generally, all the combinations of serial and parallel/serial modes may be considered (the illustrated examples are not exhaustive). It is also possible to consider a subdivision of a spacer chamber into two parts, as illustrated in FIG. 16, for example by installing a partition 110 in the chamber. The spacer may be composed of closed side walls, possibly preformed, or of opened side walls, or it may also have an opened side wall and a closed side wall, possibly preformed. Of course, in this case, each opened wall may be closed either by a diaphragm or by a plate. The plate may be an inserted part, or an integral part of the spacer (in this case, it is obtained by forming or by machining). Otherwise, the wall may include surface deformations forming, for example, disturbing devices and/or guides.

As has been previously described, and as illustrated in FIGS. 17A to 17D, the spacers fitted with partly opened side walls may be realised in two ways. In a first embodiment (see FIG. 17A), the opened side walls are practically flat (not conformed) and may be closed by a diaphragm or a plate. In a second embodiment (see FIGS. 17B and 17C), the opened side walls are conformed so as to install a plate or a diaphragm, possibly preformed. The embodiments illustrated in FIGS. 16 and 17 may be combined.

Figure 18:
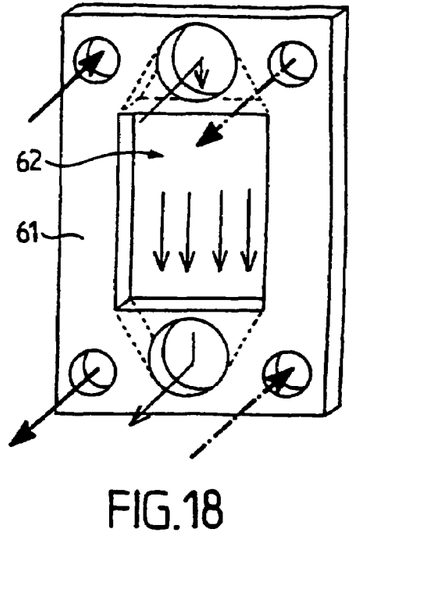
FIG. 18 is a diagrammatical perspective view of a spacer adapted to the flow of three fluids.
Figure 19:
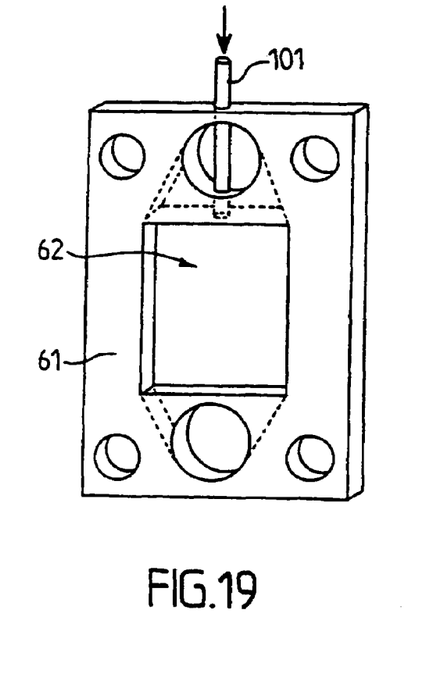
FIG. 19 is a diagrammatical perspective view of an alternative of the spacer of FIG. 18, fitted with a nozzle.

It is also possible to use spacers (opened or closed) with six supplying collection inlets, of the type of that illustrated in FIG. 18. More specifically, in this embodiment the two left apertures enable the flow of the second fluid between any second chamber, the two right apertures enable the flow of a third fluid between any second chamber, and the two centre apertures are used for supplying the first chamber with a first fluid as well as for collecting this first fluid. This type of spacer may also receive one or more nozzles, as illustrated in FIG. 19.

Figure 20:
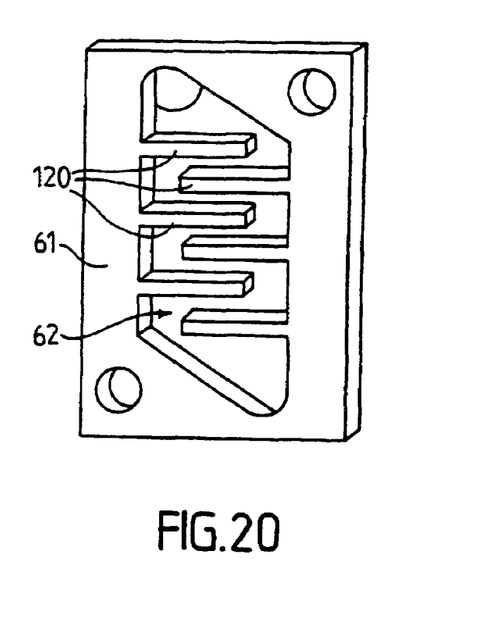
FIG. 20 is a diagrammatical perspective view of a spacer comprising a guide defining the fluid flow path.

As it was previously indicated, the first chamber may present different conformations. Among others, it may be rectangular, circular or oval. But it may also contain some disturbing devices, or guides 120 which may determine a flow path for the first fluid, as illustrated in FIG. 20 (here the guides are an integral part of the spacer which is realised by forming or machining, but they could be one or more inserted parts).

Finally, for questions of maintenance, it is preferable that the devices according to this invention be of the "one-piece" type, and assembled by means of tie-rods at which end nuts are screwed on. So, by pressing plates and/or spacers one against the other, a tight assembly is constituted that does not need any welding or gluing and, due to this fact, allows for quick dismantling. Of course, it could be quite possible to consider the use of brazed or welded plate heat exchangers. But such a heat exchanger comprising stacked plates, simply assembled by pressing them one against the other, may be cleaned more easily. Moreover this type of modular assembly is particularly advantageous and can be adjusted or adapted to changes of use.

The invention is not limited to the embodiments of devices described above which are given only as examples, but it comprises all the alternatives that may be considered by those of the art within the scope of the claims hereunder.

The invention has thus been described as applied to devices for fluids containing particles. But it is obvious that numerous other fluids, or mixtures of fluids of any kind, are concerned by the invention, and especially foodstuffs, chemicals and metallurgy. As a matter of fact, the invention enables chemical reactions to be permanently controlled via heat exchange as well as by injecting one or several reactants. Moreover, the fluids may be in liquid, gaseous, solid/liquid or liquid/gaseous forms.

Furthermore, the invention also applies to desorption and to absorption, these operations being ensured independently from other the operations previously mentioned, or in complement to them.

The invention claimed is:

1. A device for exchange or reaction between at least two fluids, comprising tightly stacked modular blocks, each modular block comprising a first chamber for the flow of a first fluid and a second chamber for the flow of a second fluid, said first and second chambers being separated one from the other by a first exchange wall suitable for an exchange or a reaction between the fluids, wherein each modular block comprises a first spacer with a recessed center part forming said first chamber, the second chamber being formed between said first exchange wall and a second exchange wall, said first and second exchange walls being stacked one to the other and said second exchange wall being an independent wall or a closed side wall of a second spacer, and wherein each spacer and each exchange wall is provided with two or three holes in one of its ends and two or three holes in its opposite end for supplying the fluids to said first and second chambers and for collecting the fluids from said first and second chambers.

2. A device according to claim 1, wherein a first side wall of the first spacer is closed so as to form said first exchange wall and present an outer face adapted to cooperate with a plate so as to jointly define said second chamber, said first spacer, or said first spacer and said plate, defining a modular processing block.

3. A device according to claim 2, comprising at least two blocks, the first spacer of which comprises a second opened side wall, parallel or inclined related to the first closed side wall, and arranged to be closed by a plate of another block.

4. A device according to claim 2, comprising another first spacer, the outer face of the first exchange wall of which is destined to be tightly sealed by the said plate so as to define another second chamber, the said first spacers and the said plate defining a modular processing overblock.

5. A device according to claim 1, comprising at least two first spacers having at least one first closed side wall so as to form a first exchange wall adapted to define with another first exchange wall a second chamber, the said first spacers so defining a modular processing block.

6. A device according to claim 5, comprising at least two blocks, the first spacers of which each comprises a second side wall placed opposite a first side wall and closed so as to form a second exchange wall, each second exchange wall being adapted to define with another second exchange wall another second chamber.

7. A device according to claim 5, comprising a diaphragm inserted between two successive first spacers to subdivide the second chamber into two parts, the said diaphragm forming the exchange wall.

8. A device according to claim 1, wherein the first spacer comprises a first opened side wall, and it comprises at least a first and a second plates arranged to jointly define the said second chamber, the first plate being additionally destined to close the said first opened side wall by forming the said first exchange wall, and the said first spacer and the said first and second plates so defining a modular processing block.

9. A device according to claim 8, comprising at least two blocks, the first spacers of which each comprises a second opened side wall, placed opposite a first opened side wall, and suitable to be tightly closed by a second plate of another block.

10. A device according to claim 1, wherein the first exchange wall is a diaphragm.

11. A device according to claim 1, comprising a second spacer of a selected thickness and including side walls defining the said second chamber, at least partly recessed for the flow of a second fluid, the said first and second spacers having a first opened side wall, the said first opened walls of the first and second spacers being destined to be placed one facing the other by inserting a separation diaphragm or a plate forming the said first exchange wall, and the said first and second spacers and the said diaphragm or plate defining a modular processing block.

12. A device according to claim 11, comprising at least two blocks, the first spacers of which each comprises a second opened side wall placed opposite a first side wall, and suitable to be placed opposite a second side wall of another block by inserting another diaphragm or a plate.

13. A device according to claim 2, wherein at least some of the plates forming an exchange wall are fitted with fluid disturbing devices.

14. A device according to claim 13, wherein at least some of the disturbing devices are plate surface deformations.

15. A device according to claim 13, wherein at least some of the disturbing devices are elements inserted on the plate.

16. A device according to claim 1, wherein at least some of the first spacers comprise a wall destined to subdivide their first chamber into two parts.

17. A device according to claim 1, wherein at least one of the spacers includes means of injection arranged to inject at least a third fluid into the chamber of the said spacer.

18. A device according to claim 1, wherein at least one of the spacers comprises three upper apertures and three lower apertures for supplying three fluids, and a collection of the said three fluids.

19. A device according to claim 1, wherein at least one of the spacers includes one inserted element selected from a group consisting of a processing material, a vortex generator, a fluid flow guide and a stirrer.

20. A device according to, claim 19, wherein the processing material is a metallic foam.

21. A device according to claim 19, wherein the processing material is selected from a Catalytic foam and a catalytic liner.

22. A device according to claim 1, wherein at least one of the spacers is constituted of the assembly of at least two sub-spacers.

23. A device according to claim 2, including at least two blocks or modular parallel overblocks, serially mounted so that an outlet of a first chamber of one of the blocks supplies with a first fluid the inlet of a first chamber of another block or overblock and that an outlet of a second chamber of one of the blocks or overblocks supplies with a second fluid an inlet of a first chamber of another block or overblock.

24. A device according to claim 2, comprising at least two blocks or modular overblocks, the chambers of which comprise at least one first inlet and one outlet, and the said blocks or overblocks being mounted in parallel so that all the first inlets are jointly supplied with a first fluid a distributor and all the outlets supply a manifold.

25. A device according to claim 1, wherein the second fluid is a heat conductor fluid or a secondary refrigerant fluid.

* * * * *